J. E. HARRIGAN.
VEHICLE WHEEL.
APPLICATION FILED DEC. 11, 1918.

1,332,721.   Patented Mar. 2, 1920.

INVENTOR
John E. Harrigan
BY
HIS ATTORNEYS

UNITED STATES PATENT OFFICE.

JOHN E. HARRIGAN, OF NEW YORK, N. Y., ASSIGNOR TO EAGLE PUNCTURE PROOF TIRE & WHEEL CO., INC., OF NEW YORK, N. Y., A CORPORATION OF NEW YORK.

VEHICLE-WHEEL.

1,332,721.  Specification of Letters Patent.  Patented Mar. 2, 1920.

Application filed December 11, 1918. Serial No. 266,359.

*To all whom it may concern:*

Be it known that I, JOHN E. HARRIGAN, a citizen of the United States, residing in the borough of Manhattan, city, county, and State of New York, have invented an Improvement in Vehicle-Wheels, of which the following is a specification.

This invention relates to a vehicle wheel and particularly to that type of wheel known as a resilient vehicle wheel in which between the felly of the wheel and a solid tread a plurality of pneumatic tubes have been employed. I am aware that heretofore in this general type of vehicle wheel, it has been proposed to employ in conjunction with the parts already designated, various forms of spring members. From actual practice, I have demonstrated the fact that in this type of vehicle wheel when used on heavy trucks, the spring members or equivalent structures are necessary, but when used on relatively light vehicles, such for example as the general construction of vehicles employed for touring or other pleasure purposes, these spring or resilient devices are entirely unnecessary and for this reason, my present invention includes a vehicle wheel structure in which in conjunction with the felly of the wheel, there is employed a solid tread member, a plurality of pneumatic tubes or yielding members and devices for detachably securing the pneumatic tube or yielding members in position in the wheel, the additional spring devices or other similar resilient members being entirely omitted in the structure of this wheel.

Figure 1:
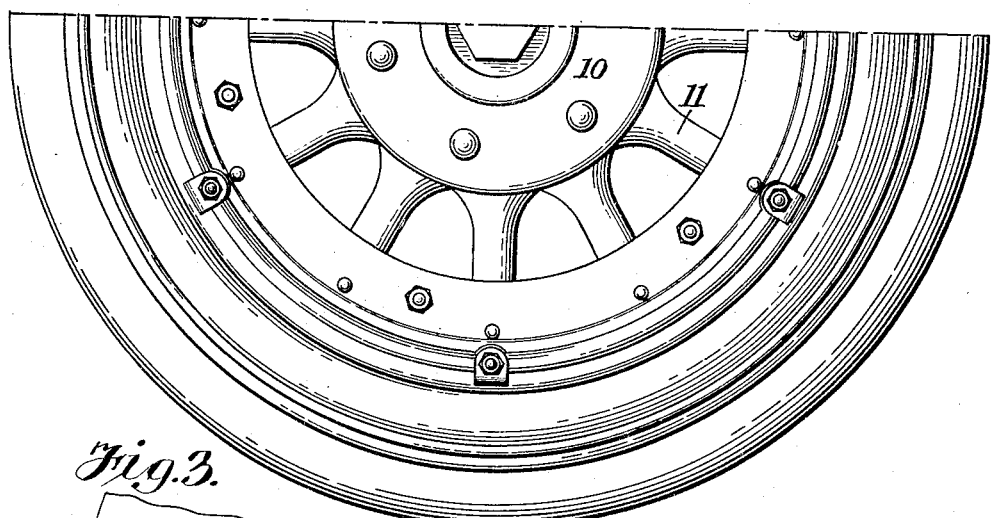
Figure 3:
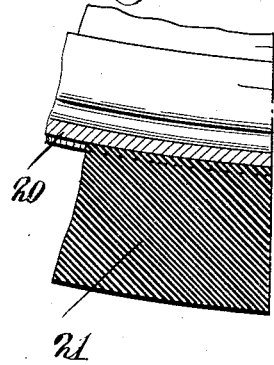
Figure 2:
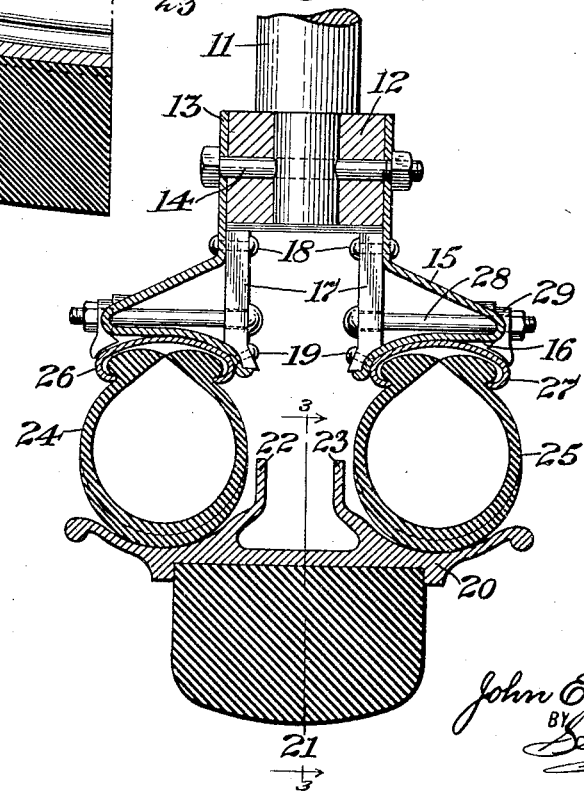

The preferred form of the wheel as constructed in accordance with my present invention will be hereinafter more particularly described in conjunction with the accompanying drawing in which, Figure 1 is a partial side elevation of my improved vehicle wheel, and, Fig. 2 is a partial radial cross-section thereof, and Fig. 3 is a cross section taken on the line 3—3, Fig. 2.

Referring particularly to the drawing, the hub of the wheel is indicated at 10, the spokes of the wheel are indicated at 11 and the felly of the wheel is indicated at 12. The parts of the structure including my present invention preferably comprise felly plates 13 adapted to lie against the outer face of the felly 12 and to be secured thereto by bolts 14 or in any other suitable manner. As the felly plates are similarly constructed, but one of them will be particularly described. Each felly plate 13 includes an angular flange 15 extending outwardly therefrom with the outer surface of the outer member of the flange being preferably concaved as indicated at 16. Associated with each angular flange 15, there is a plurality of bracket members 17 extending preferably in a radial direction from the felly and each secured at one end to the outer portion of the felly plate 13 by a bolt or rivet 18, while at the other end each bracket 17 is secured to the inner end of the outer member of the corresponding flange 15 by a bolt or rivet 19.

I also employ an outer rim member 20 in which there is suitably secured a solid tread 21 made of rubber or other suitably yielding material. The outer rim member 20 is provided with spaced pockets and centrally with inwardly extending and spaced flanges 22 and 23 which act as stops for the pneumatic tubes as hereinafter described. These pneumatic tubes are indicated at 24 and 25, and as shown, the outer surfaces of these pneumatic tubes are adapted to fit in the pockets provided therefor in the outer rim 20. Associated with the pneumatic tube 24, is a tube rim 26 and similarly associated with the pneumatic tube 25 is a tube rim 27. The tube rims 26 and 27 are adapted to engage the inner sides of the pneumatic tubes in any manner well known in the art, and each tube rim is adapted to fit in the concave face of the outer member of the flange 15.

In order to secure the pneumatic tubes in place, and as indicated in the drawings, I preferably employ series of bolts 28, each of which passes through a bracket 17 and also through an opening provided therefor at or adjacent the apex of the angular flange 15 together with suitable clamp members 29 each of which is provided with a bolt hole to receive the outer end of a bolt 28, and is adapted to bear against the portion of the outer face in corresponding tube rim so as to force the same to position against the concave face of the outer member of the flange 15 and maintain the parts in this position.

In the normal use of the vehicle wheel construction hereinbefore described, the parts assume the relative positions as shown in Fig. 2 so that when properly inflated the pneumatic tubes do not bear against the stop flanges 22 and 23, due however to the side thrusts experienced in use these flanges 22 and 23 act as stops to substantially limit the relative side movements of the part of the structure acting in a like manner as will be understood when the tubes are partly deflated. Also as will be understood, the pneumatic tubes or either of them are detachably connected by the bolt and clamp structure as hereinbefore described, so that if necessary the tubes or either of them may be readily removed and replaced.

I claim as my invention:

1. In a vehicle wheel and in combination with the felly thereof, felly plates each secured to the said felly, angular flange members, an outer rim member, a solid tread secured in the said outer rim member, pneumatic tubes between the said angular flange members and the said outer rim member, and spaced flanges extending inwardly from the said outer rim member terminating short of the said angular flange members and normally spaced from the said pneumatic tubes thereby acting as stops in the relative lateral movements of the inner and outer wheel structures.

2. In a vehicle wheel and in combination with the felly thereof, felly plates each secured to the said felly, angular flange members, the parts of each of which form a rib extending outwardly from a felly plate, brackets extending interiorly across and secured to the bases of the parts forming said angular flange members, an outer rim member, spaced stops extending inwardly from the said outer rim member and terminating short of the said angular flange members, a solid tread secured in the said outer rim member, and pneumatic tubes between the outer portions of the said angular flange members and inner portions of said outer rim member.

3. In a vehicle wheel and in combination with the felly thereof, felly plates each secured to said felly, angular flange members, the parts of each of which form a rib extending outwardly from each felly plate, an outer rim member, spaced stops extending inwardly from the said outer rim member and terminating short of the said angular flange members, a solid tread member secured in the said outer rim member, pneumatic tubes, parts of which bear against inner portions of the said outer rim member, a tube rim for each pneumatic tube bearing against the face of the outer portion of one of said angular flange members, and means associated with the said angular flange members for engaging the said tube rims to secure the same in position.

4. In a vehicle wheel and in combination with the felly thereof, felly plates each secured to the said felly, angular flange members, the parts of each of which form a rib extending outwardly from a felly plate, a series of brackets extending interiorly across and secured to the bases of the parts forming each of the angular flange members, an outer rim member, spaced stop flanges extending inwardly therefrom and terminating short of the said angular flange members, a solid tread secured in the said outer rim member, pneumatic tubes, portions of which bear against the inner faces of the said outer rim member and the sides of which are normally spaced from the said stop flanges extending inwardly from the said outer rim member, a tube rim for each pneumatic tube adapted to bear against the outer surface of the outer portion of an angular flange member, series of bolts each passing through one of said brackets and through the angular portion of an angular flange member, and a clamp for each bolt adapted to engage one of the said tube rims to secure the same in position.

Signed by me this 6th day of December, 1918.

JOHN E. HARRIGAN.